(12) United States Patent
Jaarsma

(10) Patent No.: US 8,647,543 B2
(45) Date of Patent: Feb. 11, 2014

(54) FIBER REINFORCED CELLULAR FOAM PRODUCT

(76) Inventor: Frank Jaarsma, Rochester Hills, MI (US)

( * ) Notice: Subject to any disclaimer, the term of this patent is extended or adjusted under 35 U.S.C. 154(b) by 0 days.

(21) Appl. No.: 12/707,125

(22) Filed: Feb. 17, 2010

(65) Prior Publication Data
US 2010/0140824 A1 Jun. 10, 2010

Related U.S. Application Data

(63) Continuation of application No. 11/836,899, filed on Aug. 10, 2007, now abandoned.

(51) Int. Cl.
*B29C 44/34* (2006.01)

(52) U.S. Cl.
USPC ......................................................... 264/45.3

(58) Field of Classification Search
CPC ........................... B29C 44/3442; B29C 44/348
USPC ....................................................... 264/45.3
See application file for complete search history.

(56) References Cited

U.S. PATENT DOCUMENTS

| | | | |
|---|---|---|---|
| 4,278,769 A * | 7/1981 | Gebauer et al. ................. | 521/90 |
| 5,536,462 A | 7/1996 | Hawrylko | |
| 5,707,571 A | 1/1998 | Reedy | |
| 5,981,046 A | 11/1999 | Masui et al. | |
| 6,090,319 A | 7/2000 | Sharma et al. | |
| 6,482,515 B1 | 11/2002 | Berndt et al. | |
| 6,794,032 B2 | 9/2004 | Borgner et al. | |
| 6,844,059 B2 | 1/2005 | Bernd | |
| 6,884,377 B1 | 4/2005 | Burnham et al. | |
| 6,985,628 B2 | 1/2006 | Fan | |
| 7,172,333 B2 | 2/2007 | Anderson et al. | |
| 2003/0003291 A1 | 1/2003 | Shah et al. | |
| 2005/0042434 A1 | 2/2005 | Kishbaugh et al. | |
| 2006/0103045 A1* | 5/2006 | O'Brien-Bernini et al. . | 264/45.9 |
| 2008/0300355 A1* | 12/2008 | Kenny et al. ................ | 264/176.1 |

FOREIGN PATENT DOCUMENTS

| | | |
|---|---|---|
| EP | 1645386 A1 | 4/2006 |
| WO | WO 0226482 A1 | 4/2002 |

OTHER PUBLICATIONS

"Saturation Thermodynamics", http://www.engineersedge.com/thermodynamics/saturation.htm.*
Rosenfield, et al., "Digital Picture Processing," vol. 2, pp. 121-126, Academic Press: 1982.
PCT International Search Report and Written Opinion dated Aug. 21, 2008 for PCT/US2007/087436.
Translation of EP 1645386, Apr. 12, 2006.

* cited by examiner

*Primary Examiner* — Yogendra Gupta
*Assistant Examiner* — Alison Hindenlang
(74) *Attorney, Agent, or Firm* — Dority & Manning, P.A.

(57) ABSTRACT

Fiber reinforced polymer foam articles are disclosed. Through the system and process of the present disclosure, fibers can be incorporated into the foam article during an injection molding process while minimizing fiber breakage. Thus, foam articles can be produced having relatively long fibers. For instance, when using a feed stock containing fibers having a length greater than about 0.7 cm, such as from about 1 cm to about 1.3 cm, foam articles can be produced in which at least about 10% by volume of the fibers have a length greater than 3 mm and wherein at least about 1% by volume of the fibers have a length greater than about 7 mm.

27 Claims, 2 Drawing Sheets

FIBER REINFORCED CELLULAR FOAM PRODUCT

RELATED APPLICATIONS

The present application is a continuation of U.S. application Ser. No. 11/836,899, filed on Aug. 10, 2007.

BACKGROUND

Fiber reinforced thermoplastic composites generally include reinforcing fibers contained in a polymer matrix made from a thermoplastic polymer. The presence of the fibers can greatly increase certain mechanical properties of the polymer. The thermoplastic polymer, on the other hand, is capable of being formed into any suitable shape. Thus, many shaped parts in different industries can be made from polymer composite materials.

In one embodiment, shaped or molded parts made from polymer composites can be prepared from pellets of coated, long fiber reinforced composite structures. U.S. Pat. No. 6,090,319, for instance, which is incorporated herein by reference, describes generally a production process wherein continuous fibers are coated in a die and then cut to the desired length to form the pellets. The pellets are made according to a pultrusion process and can include any suitable thermoplastic polymer, such as a polyolefin, a polyamide, or mixtures thereof. Composite pellets are also disclosed in U.S. Pat. No. 6,844,059, U.S. Pat. No. 6,794,032, and U.S. Pat. No. 6,482,515, which are all incorporated herein by reference.

Shaped parts or structures can be formed from the composite pellets using any suitable process. In one embodiment, for instance, the shaped parts can be made through an injection molding process. In an injection molding process, the polymer and fiber material is heated above the softening temperature of the polymer and the resulting fluid polymer material is introduced into a mold in a manner that causes the polymer material to assume the interior shape of the mold.

In one particular embodiment, the composite polymer material is formed into a microcellular plastic foam during the injection molding process. For example, a blowing agent may be mechanically or chemically introduced into the polymer melt during the process which causes the foam to form. The blowing agent may comprise, for instance, a supercritical fluid. For example, U.S. Pat. No. 6,884,377 and U.S. Patent Application Publication No. 2005/0042434, which are incorporated herein by reference, disclose injection molding processes for producing polymer foam articles.

As stated in the '434 application, although the introduction of reinforcing fibers into molded polymer foam articles is known, one problem that has been encountered in the injection molding of these articles is that the fibers can break during the process, which can compromise the properties of the resulting articles. Thus, the '434 application is directed to injection molding polymer composite articles that results in less breakage of the reinforcing fibers. Although the process disclosed in the '434 application has shown to create less breakage of the reinforcing fibers, the present disclosure is directed to further improvements in injection molding processes for producing fiber reinforced foam polymer articles.

SUMMARY

The present disclosure is generally directed to fiber reinforced polymer foam articles. As will be described in greater detail below, through the process of the present disclosure, fiber reinforced polymer foam articles can be produced in which the articles contain great amounts of relatively long fibers. By maintaining relatively long fiber lengths, reinforced polymer foam articles can be produced having enhanced mechanical properties.

For example, through the process of the present disclosure, a polymer composite article can be produced that includes a polymer matrix made from a thermoplastic polymer having a cellular structure. Fibers can be dispersed in the polymer matrix. The fibers, in one embodiment, can be present in the polymer matrix in an amount of at least about 10% by weight and can have a length characterized in that at least 10% of the fibers by volume have a length greater than about 3 mm, such as from about 3 mm to about 4 mm.

In one embodiment, at least some of the fibers contained in the polymer matrix can have a length greater than about 6 mm. For instance, at least 1% of the fibers by volume can have a length greater than about 7 mm. The above lengths can be achieved when forming the polymer composite article from pellets containing fibers having a length of greater than about 0.7 cm.

The average fiber length of the fibers contained in the polymer composite article can vary depending upon various factors, including the starting material and the process conditions. The average fiber length, for instance, can be greater than about 1.25 mm, such as greater than about 1.3 mm, such as greater than about 1.4 mm, such as even greater than 1.5 mm.

The thermoplastic polymer used to form the polymer composite article can comprise any suitable polymer or polymer blend. In one embodiment, for instance, the thermoplastic polymer may comprise a polyolefin, a polyamide, or mixtures thereof. As used herein, the term "polyolefin", the term "polyamide" or any other similar polymer class includes homopolymers, copolymers, terpolymers, and the like. Polyolefins that may be used in the process according to the present disclosure include polyethylene, polypropylene, and mixtures thereof.

In general, any suitable fiber can be combined with the thermoplastic polymer to form the composite article. In one embodiment, for instance, the fibers may comprise glass fibers. Other fibers that may be used include talc fibers, wollastonite fibers, carbon fibers, metal fibers, aromatic polyamide fibers, and mixtures thereof.

As described above, the polymer composite article has a cellular structure. For instance, the structure can include open cells and/or closed cells. In one embodiment, for instance, the article can have a void volume of at least about 5%, such as at least about 10%. The cells can have any suitable size, such as having an average cell size of less than about 100 microns. The cell density can be at least about $10^6$ cells per cubic centimeter.

The polymer composite articles made in accordance with the present disclosure can be made using an injection molding process. A specially designed screw can be contained in the injection molding equipment that assists in preserving the fiber length. Ultimately, polymer composite articles can be formed that have a drop impact of greater than about 7 ft-lbs, such as greater than about 8 ft-lbs. The polymer composite article can also have a notched impact of greater than about 2.5 ft-lbs/in$^2$. In addition, the polymer composite article can have a flexural strength of greater than about 19,000 psi, such as greater than about 19,500 psi and can a tensile strength of greater than about 12,000 psi, such as greater than about 12,500 psi.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
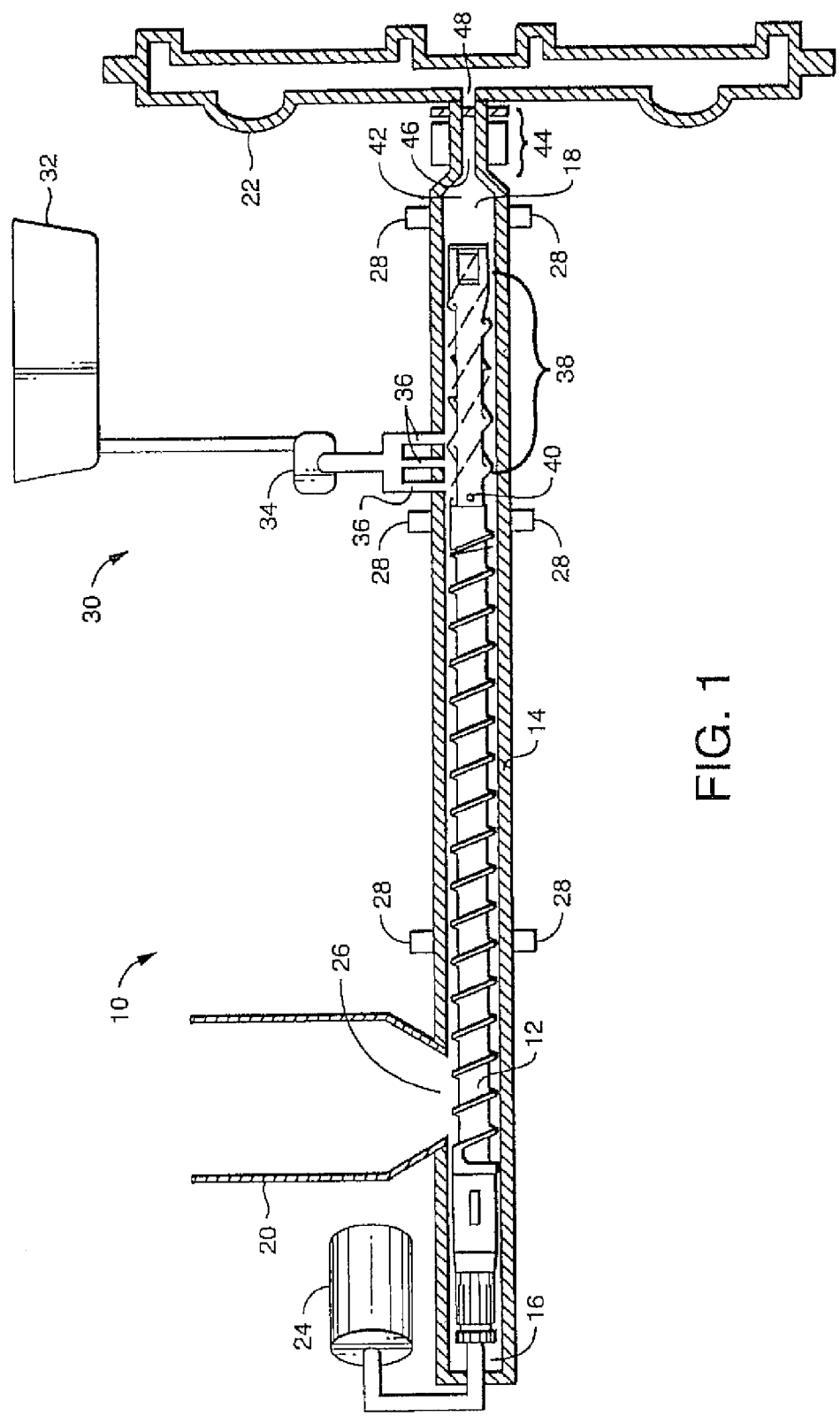
FIG. 1 is a cross sectional view of an injection molding system that may be used to produce fiber reinforced polymer foam articles in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

In general, the present disclosure is directed to fiber reinforced polymer foam articles having improved properties. The foam articles can be produced according to an injection molding process and can be reinforced using any suitable fiber, such as glass fibers. Through the process of the present disclosure, fibers can be incorporated into the polymer foam articles in a manner that minimizes fiber breakage during the injection molding process. Consequently, polymer foam articles can be produced having relatively long fiber lengths which serve to enhance the mechanical properties of the resulting articles. In one embodiment, the fiber reinforced polymer foams can be made by mechanically or chemically dispersing a blowing agent into a composite polymer melt during the injection molding process. The blowing agent, for instance, can be a gas such as carbon dioxide or nitrogen. In one embodiment, the blowing agent may comprise a supercritical fluid.

A supercritical fluid is a gas that exists above its critical point. The critical point of a gas is the highest temperature and pressure at which a substance can exist as a vapor and liquid in equilibrium. Carbon dioxide at a pressure of about 1100 psi or nitrogen at a pressure of about 750 psi becomes supercritical and dissolves into the polymer melt. As the molding pressure decreases, the gas undissolves to form a foam having a cellular structure. The cellular structure can be open or closed. The cell sizes can vary but are generally less than about 100 microns, such as from about 5 microns to about 100 microns.

Fiber reinforced polymer foams made in accordance with the present disclosure have numerous applications and uses. For instance, since the fiber reinforced foam composites can be formed into any suitable shape, the composites can be used to form various different products and various different parts to be used in numerous systems. For instance, in one embodiment, the foam composites of the present disclosure can be used to form automobile parts, sound insulation materials, or may be used in aircraft applications, in marine applications, etc.

The fiber reinforced polymer foam articles of the present disclosure are formed through an injection molding process using a specially designed screw that is intended to minimize fiber breakage. As will be described in greater detail below, fiber breakage is also minimized by carefully controlling certain process conditions.

Referring to FIG. 1, for instance, one exemplary embodiment of an injection molding system generally 10 that may be used to form fiber reinforced polymer foam articles in accordance with the present disclosure is illustrated. As shown, the molding system 10 includes a screw 12 contained within a barrel 14. The barrel 14 includes a first end 16 and a second end 18. The barrel 14 is in communication with a hopper 20 towards the first end 16 and in communication with a molding cavity 22 towards the second end 18. The screw 12 is in operative association with a drive motor 24 that causes the screw to rotate.

During the molding process, polymer pellets containing reinforcing fibers are placed into the hopper 20 and are introduced into the barrel 14 through an opening 26. Within the barrel 14, the polymer pellets are heated into a molten state. The drive motor 24 rotates the screw 12 which then, in turn, pushes the molten polymer composite material down through the barrel and into the molding cavity 22.

In order to heat the composite polymer within the barrel 14, the barrel 14 can be in communication with any suitable heating device. For instance, the barrel 14 can be heated through electrical resistance heaters, gas heaters, and the like. In one embodiment, the heating device that heats the barrel 14 can be controlled so that different zones of the barrel are at different temperatures. In this regard, the barrel 14 can be in communication with a plurality of temperature control units 28. The temperature control units, for instance, can monitor the temperature of the barrel 14 and can send information to a controller, such as a microprocessor or programmable logic unit. The controller, in turn, can control the heating device for maintaining the temperature of the barrel at the various locations within preset temperature limits. The temperature control units can work in conjunction with a controller in a closed loop manner or in an open loop manner.

The composite polymer pellets contained in the hopper 20 and fed to the barrel 14 can include any suitable polymer material. The polymer material, for instance, may comprise a single polymer or may comprise a combination or blend of polymers. In general, the polymer contained within the composite pellets comprises a thermoplastic polymer. The thermoplastic polymer may be a homopolymer, a copolymer, a terpolymer, and the like. The thermoplastic polymer may also be amorphous, semicrystalline, or crystalline.

Suitable thermoplastic polymers that may be used to construct the composite polymer pellets include, for instance, any suitable polyolefin. Examples of polyolefins include homopolymers and/or copolymers of high, medium, or low density polymers, such as polyethylene, polypropylene, polymethylpentene, and copolymers of the above. The homopolymers and copolymers may be straight-chain or branched. In one embodiment, for instance, a semicrystalline homopolymer of an alpha-olefin and/or ethylene, or copolymers of these may be used. In one particular embodiment, polypropylene is contained within the composite polymer pellets.

In other embodiments, the thermoplastic polymer may comprise a polyamide, such as any suitable nylon. Other thermoplastic polymers include polyesters, polyimides, fluoropolymers, polyvinyl chloride, polyaromatics, and styrenic polymers. Styrenic polymers include polystyrene, ABS rubbers, block copolymers, and the like. The polymer contained within the composite pellets may also comprise a metallocene-catalyzed polyolefin, such as a polyethylene, that may be considered a thermoplastic elastomer.

In general, thermoplastic polymers that may be used to form the fiber reinforced polymer articles can have a melt flow rate of less than about 40, such as those having a melt flow rate of less than about 10.

The fiber contained within the composite polymer pellets can also vary depending upon the particular application and the desired result. In general, any suitable reinforcing fiber may be used. For example, in one embodiment, glass fibers may be used as the reinforcing fibers. Other reinforcing fibers that may be used in accordance with the present disclosure include talc fibers, wollastonite fibers, carbon fibers, metal fibers, aromatic polyamide fibers (e.g. KEVLAR), and fibers made from aromatic liquid crystalline polymers (e.g. VECTRA).

Fiber diameters and fiber lengths of the fibers contained within the composite pellets can also vary. In general, for instance, the reinforcing fibers can have a diameter of less than about 500 microns, such as less than about 250 microns, such as less than about 100 microns. For instance, when using glass fibers, the fibers can have a fiber diameter of from about 8 microns to about 25 microns and can have a weight of from about 500 to about 4400 grams per 1000 m. If desired, the fibers can also be pretreated with a sizing that may facilitate mixing with the polymer material.

The length of the fibers contained within the composite polymer pellets can, in one embodiment, be relatively long or, in other embodiments, may be relatively short. The present disclosure, however, is particularly well suited to minimizing fiber breakage when using relatively long fibers. In this regard, the initial fiber length can be greater than about 0.7 cm, such as greater than about 1 cm. For instance, the fibers can have a length of from about 0.7 cm to about 2 cm, such as from about 1 cm to about 1.5 cm. In other embodiments, however, relatively short fibers may be contained within the composite polymer pellets. For instance, the fibers can have a length of less than about 0.7 cm, such as from about 0.1 cm to about 0.5 cm.

The amount of fibers contained within the composite polymer can also vary depending upon various factors. For instance, the amount of fibers contained within the polymer composite can depend upon the type of fibers used, and the end use application for the resulting foam article. In general, the fibers can be contained within the composite polymer in an amount from about 5% to about 80% by weight, such as from about 10% to about 70% by weight. In one particular embodiment, for instance, the fibers can be contained within the composite polymer in an amount from about 30% by weight to about 50% by weight.

Composite polymer pellets that may be used in accordance with the present disclosure can be obtained from various commercial sources. For example, the Cellanese Corporation of Dallas, Tex., markets various different fiber reinforced polymer pellets under the name CELSTRAN. CELSTRAN PP-GF 40-02-04, for instance, comprises composite polymer pellets containing 40% by weight glass fibers contained in a polypropylene matrix. CELSTRAN PA 6-GF50-03, on the other hand, contains 50% by weight glass fibers contained in a polyimide matrix.

In one embodiment, the composite pellets are formed by impregnating fiber rovings and then cutting the impregnated fiber rovings to a desired size. In this manner, chopped fibers become incorporated into the polymer pellets. The resulting pellets, for instance, have a rod-like shape having a length of from about 0.7 cm to about 2 cm and having a diameter of from about 1 mm to about 10 mm.

In the embodiment illustrated in FIG. 1, as described above, the hopper 20 is intended to contain the composite polymer pellets. It should be understood, however, that in other embodiments a molten polymer material can be added directly into the barrel 14.

In addition to one or more polymers and the reinforcing fibers, the polymer composite fed through the barrel 14 can also contain various other additives. Other additives may include, for instance, lubricants, dyes, pigments, antioxidants, heat stabilizers, light stabilizers, particulate reinforcing agents, fillers, hydrolysis stabilizers, and the like.

In order to form a cellular or foam product, the molten polymer composite material moved through the barrel 14 is combined with a blowing agent prior to being fed to the molding cavity 22. In this regard, the barrel 14 can be placed in communication with a blowing agent delivery system generally 30. As shown, the blowing agent delivery system 30 includes a blowing agent supply 32 in communication with a pressure and metering device 34. From the blowing agent supply 32, a blowing agent is fed into the barrel 14 through at least one port 36. As shown, the barrel 14 can include a plurality of ports 36. For example, in the embodiment illustrated, the blowing agent delivery system 30 includes three ports 36. Each of the injection ports 36 may, if desired, be in communication with a shutoff valve which allow the flow of the blowing agent into the extruder barrel 14 to be controlled as a function of axial position of the rotating screw 12.

In general, any suitable blowing agent may be used in the process. The blowing agent, for instance, may comprise a physical blowing agent or a chemical blowing agent. Examples of suitable blowing agents include, for instance, hydrocarbons, chlorofluorocarbons, nitrogen, carbon dioxide, helium, and the like.

In one embodiment, the blowing agent may comprise a supercritical fluid. Supercritical fluids that may be used include, for instance, carbon dioxide, nitrogen, or combinations thereof. Supercritical fluids can be introduced into the barrel and made to rapidly form a single-phase solution with the polymer composite material either by injecting the additive as a supercritical fluid, or injecting it as a gas or liquid and allowing conditions within the extruder to render it supercritical.

Combining a supercritical fluid with the composite polymer material produces a single-phase solution having a very low viscosity which advantageously allows lower temperature molding, as well as rapid filling of molds having close tolerances to form very thin molded parts, parts with very high length to thickness ratios, parts including thicker distal regions, molding carried out at low clamp force, and the like.

The supercritical fluid thus not only reduces the viscosity of the molten polymer material but also serves as a blowing agent. Using a supercritical fluid also allows for the control of the resulting properties of the foam. In particular, cellular, and particularly microcellular, articles can be produced having a void volume and/or a cell size and/or a cell density within controlled limits. All of these advantages can be obtained while using a relatively low amount of the supercritical fluid. For instance, the supercritical fluid can be present in the composite polymer material in an amount less than about 10% by weight, such as less than 5% by weight, such as less than 1% by weight, such as even less than about 0.5% by weight.

As mentioned above, the supercritical fluid allows for the injection of the composite polymer material into the mold cavity 22 at reduced temperatures. For instance, injection can take place at a molding chamber temperature of less than about 100° C., such as less than about 75° C., such as less than about 50° C., such as less than about 30° C., or even less than about 10° C.

The pressure and metering device 34 is positioned in between the blowing agent supply 32 and the at least one port 36. The pressure and metering device 34 can be used to meter the mass of the blowing agent, such as between about 0.01 lbs/hr to about 70 lbs/hr.

The particular blowing agent used and the amount of blowing agent incorporated into the composite polymer material can be selected so as to produce a foamed product with the desired cell size and void volume.

As shown in FIG. 1, the one or more ports 36 are located within or upstream from a mixing section 38 of the screw 12. The ports 36 can be located at different locations along the barrel. In one embodiment, for instance, two ports may be positioned on opposing top and bottom sides of the barrel 14. A blowing agent entering the barrel 14 through the ports 36 rapidly and evenly mixes with the molten composite polymer material into a fluid polymer stream. When the blowing agent is a supercritical fluid, a single-phase solution is produced. Having a plurality of ports that are positioned radially around the barrel 14 may enhance mixing. Further, it should be understood that many more ports 36 may be positioned along the barrel 14.

As shown in FIG. 1, the screw 12 contained within the barrel 14 includes a first portion of flights or threads that are unbroken and a second portion 38 containing broken threads. In addition, the screw 12 can include a check valve 40 that separates a first section from a second section.

In one embodiment, the ports 36 are located opposite unbroken flights along the screw 12. In this manner, as the screw rotates, each flight passes or wipes each port periodically. This wiping increases rapid mixing of the blowing agent with the composite molten polymer material. In particular, the flights rapidly open and close each port as the screw 12 rotates. The result is the distribution of relatively finely-divided, isolated regions of blowing agent in the fluid polymer material immediately upon injection and prior to any mixing.

Once the blowing agent is combined with the composite molten polymer material, the resulting mixture is then fed through the mixing section 38 contained within the barrel 14. In the mixing section, the blowing agent becomes intimately mixed with the polymer. As described above, when a supercritical fluid is present, the fluid dissolves within the polymer.

As shown in FIG. 1, the mixing section 38 includes a plurality of broken flights. More particularly, the flights include spaced apart gaps. The gaps allow better mixing of the components.

In accordance with the present disclosure, the mixing section is particularly well designed to prevent against fiber breakage. In particular, the screw 12 includes less than six flights between the end of the screw and the ports 36. For example, the screw 12 can include three to five flights, such as four flights within the mixing section. In addition, the gaps contained within the flights within the mixing section 38 have a greater length than similar screws designed in the past. In particular, the gaps have a length of at least about 10 mm, such as from about 12 mm to about 20 mm.

Providing the relatively wide gaps in the flights and having the gaps spaced as described above has been found to prevent fiber breakage in conjunction with using a relatively low number of flights within the mixing section.

In addition to the above, the screw 12 also contains various other unique features that are designed to prevent fiber breakage. For example, the check valve 40, in one embodiment, can be a ring check valve. In the past, for instance, similar screws included ball check valves. A ring check valve as shown in FIG. 1, however, has been found to provide improved process control.

In addition, the screw 12 has a relatively low compression ratio. For example, the compression ratio of the screw 12 is generally less than about 2.5:1, such as less than about 2.3:1, such as less than about 2.1:1. For instance, in one embodiment, the screw 12 can have a compression ratio of about 2:1.

Through the design of the screw 12, intimate mixing with the blowing agent is achieved within the barrel 14 while minimizing shear forces being subjected on the polymer material. Ultimately, the screw 12 is capable of combining the composite molten polymer mixture with the blowing agent, such as a supercritical fluid, while minimizing fiber breakage.

After the composite molten polymer material and the blowing agent are combined together, as shown in FIG. 1, the resulting mixture enters an accumulation region 42. In the accumulation region 42, the temperature of the mixture can be carefully controlled along with other process conditions. When using a supercritical fluid as a blowing agent, a single-phase, non-nucleated solution of polymer material and blowing agent containing fibers is accumulated prior to being injected into the molding cavity 22.

From the accumulation region 42, the mixture enters a nucleator 44 constructed to include a pressure-drop nucleating pathway 46. The pressure of the polymer fiber and blowing agent mixture drops below the saturation pressure for the particular blowing agent concentration at a rate or rates facilitating nucleation. Nucleation is a process by which a homogeneous, single-phase solution of polymer material, in which is dissolved molecules of a species that is gas under ambient conditions, undergoes formations of clusters of molecules of the species that define nucleation sites from which cells grow to form a foam. During nucleation, a homogeneous, single-phase solution changes to a mixture in which sites of aggregation of at least several molecules of blowing agent are formed. Nucleation defines that transitory state when gas, in solution in a polymer melt, comes out of solution to form a suspension of bubbles within the polymer melt. When using a supercritical fluid, this transition occurs by changing the solubility of the blowing agent within the polymer. Nucleation occurs in the process of the present disclosure through a rapid temperature and/or pressure drop.

The nucleator 44 as shown in FIG. 1 can be located at different locations within the injection molding system. In the embodiment shown in FIG. 1, for instance, the nucleator 44 defines a nozzle connecting the barrel 14 to the molding cavity 22. Thus, the nucleator defines an opening 48 that releases the blowing agent, fiber and polymer mixture into the molding cavity 22.

The opening 48 and the pathway 46 can have any size sufficient for a foam to form within the molding cavity 22. In one embodiment, the pathway 46 and the opening 48 can be adjustable in order to achieve a desired nucleation density. Further, while the pathway 46 defines a nucleating pathway, some nucleation may also take place within the molding cavity itself as pressure on the polymer material drops at a very high rate during filling of the mold.

Injection of the molten composite polymer material and blowing agent into the molding cavity 22 results in the production of a cellular material that may be classified as a foam. During injection of the material into the molding cavity 22, cell growth occurs. If desired, the molding cavity 22 can include vents to allow gas escape during injection.

In the embodiment illustrated in FIG. 1, the accumulation region 42 is shown located within the barrel 14. In an alternative embodiment, however, a separate accumulator may be provided. In this embodiment, the polymer material, fibers and blowing agent can be fed to a separate accumulator prior to being injected into the molding cavity 22.

As described above, the injection molding system 10 includes a uniquely designed screw 12 that is intended to minimize fiber breakage. Various other process parameters may also be carefully controlled in order to minimize any fiber damage. For instance, during the process, in one embodiment, the screw may rotate at a relatively low speed. For instance, the screw may rotate at a speed of less than about 70 rpm, such as less than about 60 rpm, such as from about 40 rpm to about 60 rpm. For instance, in one embodiment, the screw may rotate at a speed of about 50 rpm.

In addition, the present inventors have found that, in one embodiment, uniform results can be achieved when maintaining a relatively low back pressure within the barrel 14. The back pressure is the pressure (such as hydraulic pressure) applied to the back of the molding screw to resist the force of the screw pushing back as the plasticized composite resin is moved forward as the screw rotates during plasticization. In the process of the present disclosure, the pressure forcing the screw back is due primarily due to the pressurized blowing agent, such as super critical fluid in the forward chamber of the screw. This pressure requires a counter pressure to prevent the screw from being pushed backwards, which would release pressure on the gas and result in premature foaming of the polymer. The back pressure, for instance, can be less than about 2000 psi, such as less than about 1500 psi, such as less than about 1250 psi. For instance, in one embodiment, the back pressure can be maintained between about 800 psi and about 1200 psi, such at around about 1000 psi.

Ultimately, through the use of the screw 12 and the process conditions, cellular fiber reinforced polymer articles can be produced having enhanced properties. The foam articles, for instance, can have an open cellular structure or a closed cellular structure. In general, the void volume can be from about 1% to about 50%, such as from about 3% to about 25%. For instance, in one embodiment, the void volume can be from about 5% to about 15%. The average cell size can vary depending upon different process conditions. In general, the cell size is less than about 100 microns. The cell density, on the other hand, can be at least about $10^6$ cells per cubic centimeter.

The size of the fibers contained in the resulting polymer matrix can also vary depending upon process conditions, the size of the fibers contained in the initial mix, and various other factors. When the fibers have an initial length of greater than about 0.7 cm, for instance, a fiber reinforced polymer foam article can be produced wherein at least 10% of the fibers by volume have a length greater than about 3 mm, such as from about 3 mm to about 4 mm. Of particular advantage, fibers present in the matrix can have a length greater than about 6 mm, such as greater than about 6.5 mm, such as greater than about 7 mm, such as even greater than about 7.5 mm. For instance, when the initial fiber length is greater than about 0.7 cm, such as from about 1 cm to about 1.3 cm, about 1% of the fibers by volume in the resulting foam article can have a length greater than about 7 mm, such as greater than about 7.5 mm.

The average fiber length of foam articles made in accordance with the present disclosure can be greater than about 1 mm, when the initial fiber length is greater than about 0.7 cm, such as from about 1 cm to about 1.3 cm. For instance, in one embodiment, the average fiber length can be greater than about 1.1 mm, such as greater than about 1.2 mm, such as greater than about 1.25 mm. In other embodiments, even greater average fiber lengths can be achieved. For instance, the average fiber length can be greater than about 1.3 mm, such as greater than about 1.35 mm, such as greater than about 1.4 mm, such as greater than about 1.45 mm, such as even greater than about 1.5 mm.

Due in large part to the greater fiber lengths, various mechanical properties of the resulting foam article are greatly enhanced. For instance, the foam article can have a drop impact of greater than about 7 ft-lbs, such as greater than about 7.5 ft-lbs, such as even greater than about 8 ft-lbs. In addition, the foam article can have a notched impact of greater than about 2.4 ft-lbs/in$^2$, such as greater than about 2.5 ft-lbs/in$^2$. The foam article can have a flexural strength of greater than about 19,000 psi, such as greater than about 19,500 psi, such as greater than about 20,000 psi. The flexural strain of the article can be less than about 3.25%.

Fiber reinforced polymer foam articles made in accordance with the present disclosure can also have a tensile strength of greater than about 11,500 psi, such as greater than about 11,750 psi, such as greater than 12,000 psi. In fact, the tensile strength of foam articles made in accordance with the present disclosure can be greater than about 12,250 psi, such as greater than about 12,500 psi, such as even greater than about 12,600 psi. The tensile strain of the article, on the other hand, can be less than about 2.5%, such as less than about 2.4%, such as even less than about 2.3%.

Polymer foam articles according to the present disclosure even perform well under conditions of high temperature and high strain. For instance, polymer foam articles made according to the present disclosure can have a heat deflection temperature of greater than about 149° C., such as greater than about 149.5° C.

Of particular advantage, fiber reinforced, polymer foam articles made in accordance with the present disclosure also have reduced warpage. The reduced warpage is particularly significant when producing polymer articles having relatively long lengths in relation to relatively small thicknesses. Although unknown, it is believed that the design of the screw in conjunction with the process conditions allow the resulting polymer, fiber and blowing agent mixture to fill molding cavities without stresses and non-uniform shrinkages often experienced in the past.

The present disclosure may be better understood with reference to the following example.

Example

The following example demonstrates the improvements obtained when producing polymer composites in accordance with the present disclosure in comparison to past methods. In particular, in this example, composite foam polymers were produced according to the present disclosure using the injection molding system as generally illustrated in FIG. 1. In addition, samples were also produced generally using the injection molding system as disclosed in U.S. Patent Application Publication No. 2005/0042434.

Each set of samples was produced from glass fiber reinforced polypropylene pellets. A super critical fluid was used as a blowing agent in order to form a cellular composite product. Each set of samples were then subjected to various standard tests to determine their properties. In addition, fiber lengths in the resulting composite products were studied.

The following tests were conducted on the samples:
Drop Impact Test:
The drop impact test determines the ability of the sample to absorb an impact and to measure toughness. The drop impact test was tested according to ASTM Test No. 3763. Results are measured in units energy and represent the amount of energy necessary to cause a failure of the sample.

Notched Impact Test:

According to the notched impact test, a notch is placed into the polymer specimen. A striking member then strikes the specimen where the notch has been made. The test was conducted according to ASTM Test No. D256. Results are reported in the energy necessary to cause failure of the specimen.

Flexural Strength:

The flexural strength of a sample is defined as its ability to resist deformation under load. More particularly, the flexural test is conducted according to ASTM Test No. D790 and measures the force required to bend the specimen under 3 point loading conditions. For instance, the specimen is placed on a support span and a load is applied to the center. The flexural strength of the sample is measured as the amount of pressure needed to cause 5 percent deformation. Flexural strain is also recorded as a percentage. The flexural strength and strain tests were conducted according to ASTM Test No. D790.

Tensile Strength and Tensile Strain:

The tensile strength and tensile strain properties of the samples were tested according to ASTM Test No. D638.

Heat Deflection Temperature Test (HTD):

The heat deflection temperature is the temperature at which a standard specimen deflects a specified distance under a load. Specimens, for instance, are lowered into a bath where the temperature is raised at 2° C. per minute until the specimen deflects 0.25 mm. The heat deflection temperature test was conducted according to ASTM Test No. D648.

In addition to the above tests, a volume weighted fiber length distribution was also generated for each sample. The process used to determine fiber length distribution by volume is described and disclosed in U.S. Provisional Patent Application No. 60/825,200 filed on Sep. 11, 2006, and herein incorporated by reference. According to the procedure, a sample of the fiber reinforced polymer foam article is removed from the article. During removal from the article, some of the fibers may be cut. The sample preparation method used is an attempt to separate the fibers that have not been cut from those that have. The cut fibers are then discarded. The remaining sample is evaluated for entangled fibers. If entangled fibers are present, they are gently untangled using wire probes. The fibers are then randomized and placed in a Petri dish for image analysis.

A specific procedure for sample preparation is as follows:
(1) Cut a 1" inch square from the area of interest;
(2) Place sample in crucible and ash using a muffle furnace at 450° C. over-night (this temperature does not embrittle the fibers);
(3) Use an anti-static device to ensure that the glass sample dish (Pyrex glass Petri dish 100 mm×15 mm—top) is not statically charged. Place the glass sample dish over the crucible and invert crucible so that the ash is in the sample dish but retains its shape;
(4) With a brush, probe, or tweezers, gently part the outer fibers away from the center of the ash to separate those fibers that may have been cut from those which have not. The remaining sample should be ~¾" by ¾".
(5) Place the crucible over the separated center portion of uncut fibers and invert the glass sample dish over an open plastic bag, which will catch the unwanted saw-cut fibers. Tap the dish to dislodge the fibers that may adhere due to static electricity;
(6) Examine the ash that is left. If large clumps exist, gently separate the clump using probe tips or narrow tweezer tip;
(7) Assemble a vacuum filtration apparatus using a vacuum flask ~1500 ml, a Beuchner funnel with fixed perforated plate (diam. 60 mm) and coarse/fast flow filter paper suitable for vacuum filtration;
(8) Place approximately 500 ml of water into a beaker (usually a 1000 ml beaker is used) and add ~40 ml of glycerin. Stir to mix;
(9) Add glass fibers to the beaker and place beaker in ultrasonic bath;
(10) Place distilled water into the ultrasonic bath so that the beaker sits lightly in the bath;
(11) Turn on ultrasonic bath and wait 30 seconds, most of the fibers will separate;
(12) While waiting, wet the filter paper with water and 'seal' it against the funnel by creating a slight vacuum. Make sure all holes are covered by the filer paper;
(13) Place pipet, with an 11 mm diameter opening in the beaker and plunge the solution in and out of the pipet ~15 to 20 times until all the fibers are suspended and randomized—there should be no clumps. (A fiber-optic light, or other bright light source, may be used to shine into the beaker and illuminate the fibers to confirm suspension and randomization). Note—ash from black parts should be rinsed and filtered first using a similar procedure so that they may be observed randomizing in the solution;
(14) If any clumps are seen, they should be removed from the solution and placed in a separate beaker or dish. Add some solution and gently separate the clump using a probe tip or narrow tweezer tip. Return to beaker;
(15) Expel any solution from the pipet and move the pipet so that the opening is in the center of the volume of solution. Draw solution in (~20 ml):
(16) Increase vacuum in filtration system and bring the pipet over the funnel. Expel the solution in a circular motion in an effort to spread the fibers uniformly over the filter paper;
(17) Rinse the fibers using methanol in a squeeze bottle. Start from the walls of the Beuchner funnel and in a circular motion work to the center of the filter paper. The rinse will dissolve the glycol relatively quickly—a relatively small amount is needed;
(18) The vacuum should be high enough so that the filter paper is observed drying soon after the methanol rinse. The filter paper should be thoroughly dry in 1 minute or less;
(19) Turn off the vacuum and take the funnel off of the flask keeping it upright;
(20) Place a clean and static treated Petri dish over the funnel and quickly invert so that the filter paper falls into the Petri dish. Remove the funnel keeping the filter paper from sliding around the dish (this action will cause the fibers to clump);
(21) Place the Petri dish on a flat surface and the push down on one edge of the filter paper to secure it from moving. Grab the opposite side with tweezers or your finger tips and lift the filter up slightly, keeping it parallel to the bottom surface of the Petri dish. Pull the paper taut, and then bring the opposite sides of the paper together so that the filter paper folds similar to a book, and snap taut to dislodge fibers from the filter paper. Move grasp on the filter paper 45 degrees and repeat;
(22) If fibers adhere to the filter paper, a soft brush (camel hair) is used to brush them into the Petri dish;

(23) The sample dish should contain randomly aligned fibers and virtually no clumps. If there are clumps: solution may have been expelled from the pipet too fast, too much solution may have been expelled from the pipet, the pipet was maneuvered too slowly over the filter paper as solution was expelled, the dry filter paper slid in the Petri dish prior to it being lifted and 'snapped', or the fiber solution is not dilute enough (add water);

(24) If there are too many fibers in the dish, select a second dish and invert the first one over the second one to reduce the number of fibers (analyze both dishes);

(25) Repeat until at least 3000 fibers are imaged. Add water and glycerin to the beaker if necessary to make up for the solution lost.

A preferred apparatus employed includes a Prior H101 motorized stage: 4"×3" travel, repeatedly ±1 μm, with controller, joystick and holder, as well as a QIcam monochromatic digital firewire camera: 1392×1040 pixels, 4.65 μm×4.65 μm pixel size, ½" optical format Electronic Shutter, 12-bit, External trigger, Zoom 70XL module with detents/ iris. There is further provided an MND44020 Nikon focus Mount and MSS modular support stand, a 150 W halogen transmitted light source with backlight, ImagePro Plus ver 6.0 software, Scope Pro plug-in module, Imaging computer: Windows XP Pro, Pentium 4 3.6 GHz processor provided with MS Office 2003 Basic and Pyrex glass Petri dish 100 mm×15 mm (top only).

Preferred software to use in connection with the apparatus is FASEP Version 1.51 Plug-In for ImagePro Plus, May, 2006, available from IDM Systems, Darmstadt, Germany. This system may be used to analyze clusters with overlaying fibers as well as curved fibers using Hough Transform analysis. For example, the Hough Transform may be used to compute the edge orientation histogram. The Hough Transform is a well-known method for finding lines. A detailed description of the Hough Transform can be found in "Digital Picture Processing", by Azriel Rosenfeld and Avinash C. Kak, (Academic Press, Inc. 1982) Vol. 2, pp. 121-126. The Hough Transform converts an edge map image into a 2-D histogram with one dimension being the line orientation and the other being the line intercept. Hough Transform entry HT (x,y) represents the length of a line that has an orientation of x and an intercept of y. The edge orientation histogram H(x) can be obtained by manipulating the HT (x,y) histogram as follows:

$$H(x)=(\Sigma HT(x,y)^2)^{1/2}$$

where the summation is over all y values.

The edge orientation (EO) algorithm is performed on the edge orientation histogram H(x) as follows:

$$EO=\Sigma H(x)\log H(x)$$

The software is sometimes manually guided, and parameters adjusted so that clusters of fibers and optionally curved fibers are properly measured. We refer to this procedure as an "automated" resolving process and thus this feature of the system is referred to as an automated cluster resolving capability. See, also, U.S. Pat. No. 6,985,628 to Fan, the disclosure of which is incorporated herein by reference in its entirety.

In general, the analysis is performed by setting a fiber diameter range and using Hough Transform analyses and rejecting results which are inconsistent with the physical image, discussed further below.

The system calibration is set using an NIST 25 mm stage micrometer so that live tiling tolerance is as tight as possible. This is done by positioning the micrometer on the stage so that it lies where frames meet in the X and Y directions. Using the User Defined tiling method and gradient blend stitching option, set X, Y, and guard frame values so that tiling with the algorithm results in a calibration of ±20 μm or less. (This is confirmed by imaging the stage micrometer.) Name the calibration file and set it as the System Calibration File.

The system operates by placing the Petri dish with dispersed fibers on the motorized stage and imaging an area approximately 65 mm×50 mm. The specimen is then processed as follows:

(1) Switch on power to the automated system BEFORE launching ImagePro;

(2) Select Acquire and StagePro;

(3) Initialize stage by selecting the second radio button down (Use physical limits of stage . . . ) and press continue on the following dialogue box. Wait for stage to stop;

(4) Click on the Lens/Mag page, select your calibration file from the drop down window. Click on Calibrate XY and then set from file. Choose the file name of the system calibration and click OK;

(5) Go to the Stage tab and set the imaging origin to the lower right corner—use preview to see where the camera is imaging. Click on set origin to current position;

(6) Set the Scan Area to 5×5 and save settings (including guard frame) with an appropriate name;

(7) Place a clean, empty sample dish on the stage and choose correct background and flat field radio buttons on the Acquire page;

(8) Acquire a background image (a single image). Select the image as the background image. Do not close the background image;

(9) Switch to the sample dish and acquire the 5×5 sequence. Select Processing from the menu bar and tile images from the drop down;

(10) Choose the sequence to input and select set from frames. Apply the user defined stitching method (previously established). Save mosaic;

(11) Launch Fasep with only one image open (Fasep performs functions on open images, only one image should be open at a time);

(12) Set measurement parameters. Length minimum=0.5 mm, fiber width is sample dependent;

(13) Set segmentation threshold so that the long fibers are adequately filled in without gaps (~205);

(14) Perform Blob analysis;

(15) Set 3 bins (dust, single fiber, cluster) for classification using fiber width. Classify sample;

(16) Check classifications and modify if needed;

(17) Separate objects into the classes;

(18) After cluster images have been generated, choose one at a time for separation analysis;

(19) Initially begin with Min. Maxima Area set at 4 and Avg. Fiber Diameter set at 8 (for ~30 μm diameter fibers) . Separate fibers using Hough Transform;

(20) Use Maxima click as cited in the Fasep directions when separation is unsuccessful. Increase the Avg. Fiber Diameter as appropriate to measure long or curved fibers;

(21) When all clusters are analyzed, open data collector and export data to clipboard.

This method enables appropriate pixel size calibration for short fibers and image processing so that approximately a 65×50 mm area can be analyzed. The process enables short and long fibers to be measured with accuracy. The fibers in the prescribed field are automatically imaged and measured so that sampling is unbiased.

In order to produce samples made according to the present disclosure, a 280 ton Nissei screw injection molding machine was used. The mold used had a 12 cavity mold. CELSTRAN pellets obtained from the Celanese Corporation of Dallas, Tex. were used to form the composite foam polymer samples. The CELSTRAN pellets comprised polypropylene containing glass fibers in an amount of 40 percent by weight. The pellets had a length of ½ inch. During the process, a super critical nitrogen fluid was fed to the molding machine in order to form a cellular structure. The composite polymer was heated to a temperature of about 420° F. during the process.

The samples made according to the present disclosure were produced using the injection molding screw shown in FIG. 1. During production of the samples, the screw was rotated at 50 rpm and the system had a back pressure of 1000 psi.

When producing the comparative examples made generally according to the system described and illustrated in U.S. Patent Application Publication No. 2005/0042434, the screw was rotated at 75 rpm and at a back pressure of 2500 psi.

The following results were obtained:

| Test | Comparative Samples | Samples Made According to Present Disclosure |
|---|---|---|
| Drop Impact Test (ft-lb) | 6.57 | 8.13 |
| Notched Impact Test (ft-lb/in$^2$) | 2.35 | 2.54 |
| Flexural Strength Test (psi) | 18,695 | 20,101 |
| Flexural Strain Test (%) | 3.26 | 3.23 |
| Tensile Strength Test (psi) | 11,639 | 12,686 |
| Tensile Strain Test (%) | 2.62 | 2.35 |
| HDT Test (° C.) | 148.4 | 149.5 |
| Average Fiber Length (mm) | 1.10 | 1.44 |

As shown above, samples made according to the present disclosure had improved properties in every category in comparison to the other samples.

Figure 2:
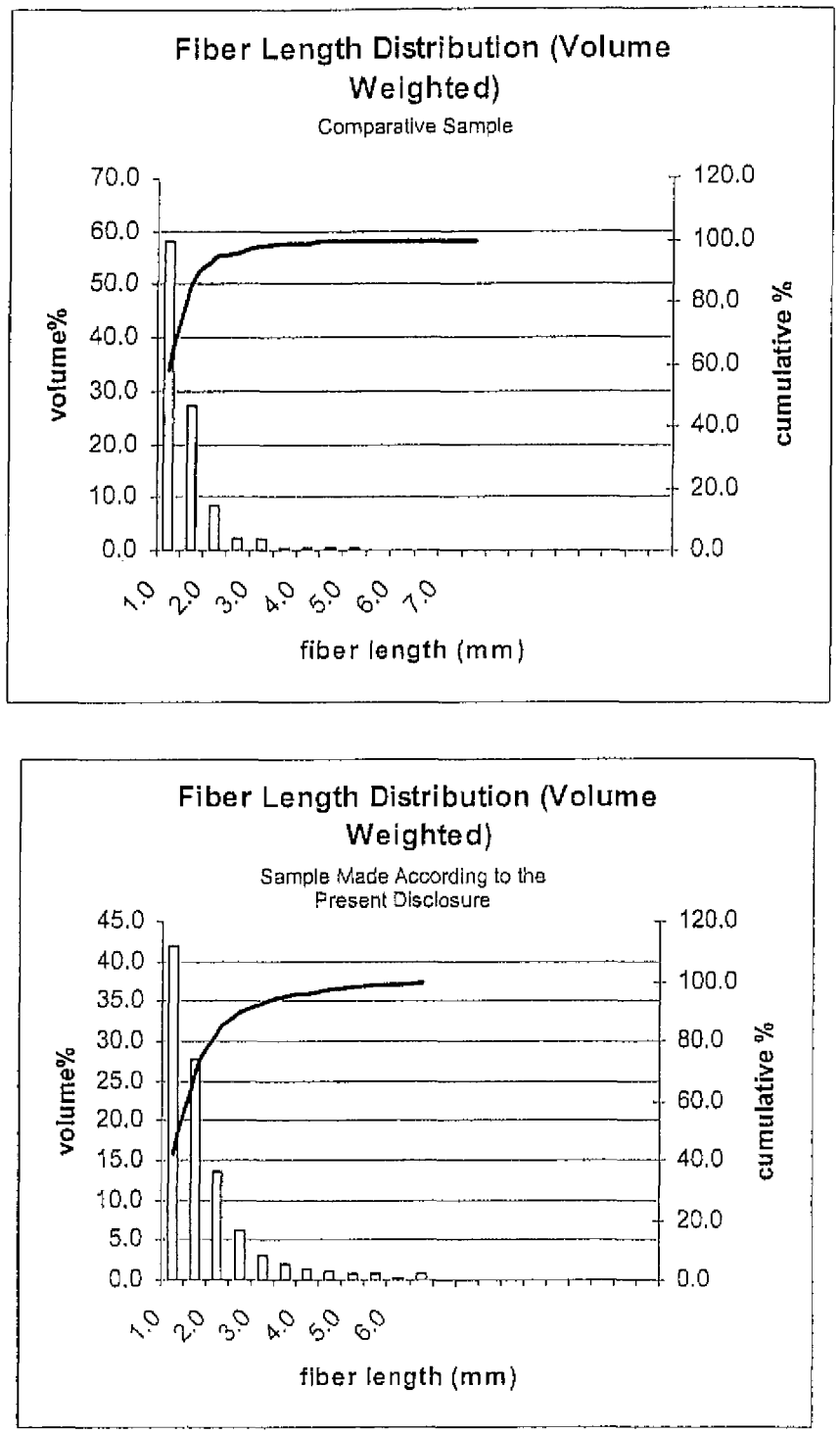
FIG. 2 is a graphical representation of some of the results obtained in the Example described below.

In addition to the above test, the fiber length distribution of the glass fibers contained in the polymer composite samples was also plotted. The results are shown in FIG. 2. As shown, the longest fiber length recorded for the comparative sample was less than 6 mm. The polymer sample made according to the present disclosure, however, had fiber lengths greater than 6 mm, such as greater than 6.5 mm, such as even greater than 7 mm. In addition, fiber lengths overall were much greater for the sample made according to the present disclosure in comparison to the comparative sample.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A process for forming a polymer composite article comprising:
    feeding composite polymer pellets comprising a thermoplastic polymer and reinforcing fibers into a barrel of an injection molding system, wherein the injection molding system comprises a screw contained within the barrel, wherein the screw has a compression ratio of less than 2.5:1, wherein the screw has a rotational speed that is less than 70 rpm, and wherein the barrel has a back pressure that is less than 2,000 psi, and wherein the screw further comprises a first section containing flights and a second section containing flights downstream from the first section, and wherein a check valve separates the first section from the second section;
    heating the thermoplastic polymer to a molten state;
    feeding a blowing agent into the barrel;
    injecting the thermoplastic polymer, reinforcing fibers, and blowing agent into a molding cavity; and
    producing a cellular fiber reinforced polymer article, wherein the reinforcing fibers in the reinforced polymer article have an average fiber length greater than 1.2 mm, wherein at least 10 percent by volume of the reinforcing fibers have a length greater than 3 mm.

2. The process according to claim 1, wherein the flights contained within the second section of the screw comprise broken flights containing spaced apart gaps.

3. The process according to claim 2, wherein the second section comprises less than 6 broken flights.

4. The process according to claim 2, wherein the second section comprises from 3 to 5 broken flights.

5. The process according to claim 2, wherein the gaps comprise a length of from about 12 mm to about 20 mm.

6. The process according to claim 2, wherein the check valve comprises a ring check valve.

7. The process according to claim 1, wherein the screw has a compression ratio of less than 2.3:1.

8. The process according to claim 1, wherein the specific back pressure is less than 1500 psi.

9. The process according to claim 1, wherein injecting further comprises injecting the thermoplastic polymer, reinforcing fibers, and blowing agent into the molding cavity at a temperature of less than about 100 degrees C.

10. The process according to claim 1, wherein the thermoplastic polymer is selected from the group consisting of polyolefins, polyamides, and combinations thereof.

11. The process according to claim 1, wherein the reinforcing fibers have a diameter of less than 500 microns and are selected from the group consisting of glass fibers, talc fibers, wollastonite fibers, carbon fibers, metal fibers, aromatic polyamide fibers, and fibers formed from aromatic liquid crystalline polymers.

12. The process according to claim 1, wherein the reinforcing fibers are present in the cellular fiber reinforced polymer article in an amount from 20% to 60% by weight.

13. The process according to claim 1, wherein the reinforcing fibers dispersed in the cellular fiber reinforced polymer article have an average fiber length greater than 1.2 mm.

14. The process according to claim 1, wherein the reinforcing fibers dispersed in the cellular fiber reinforced polymer article have an average fiber length greater than 1.25 mm.

15. The process according to claim 1, wherein the reinforcing fibers dispersed in the cellular fiber reinforced polymer article have an average fiber length greater than 1.3 mm.

16. The process according to claim 1, wherein the cellular fiber reinforced polymer article comprises a void volume from 3% to 25% and has an average cell size less than 100 microns.

17. The process according to claim 1, wherein the cellular fiber reinforced polymer article has a drop impact of greater than 7 ft-lb and a notched impact of greater than 2.4 ft-lb/in$^2$.

18. The process according to claim 1, wherein the screw has a compression ratio of from about 2.5:1 to about 2:1.

19. The process according to claim 1, wherein the cellular reinforced polymer article has a cellular structure such that the cells have a size of from about 5 microns to about 100 microns.

20. A process for forming a polymer composite article comprising:
feeding a thermoplastic polymer and reinforcing fibers into a barrel of an injection molding system, wherein the injection molding system comprises a screw contained within the barrel, wherein the screw has a compression ratio of less than 2.5:1, wherein the screw has a rotational speed that is less than 70 rpm, and wherein the barrel has a back pressure that is less than 2,000 psi, and wherein the screw further comprises a first section containing flights and a second section containing flights downstream from the first section, and wherein a check valve separates the first section from the second section;
heating the thermoplastic polymer to a molten state;
feeding a blowing agent into the barrel;
injecting the thermoplastic polymer, reinforcing fibers, and blowing agent into a molding cavity; and
producing a cellular fiber reinforced polymer article, wherein the reinforcing fibers in the reinforced polymer article have an average fiber length greater than 1.2 mm, wherein at least 10 percent by volume of the reinforcing fibers have a length greater than 3 mm, and wherein the cellular fiber reinforced polymer has a cellular structure containing cell sizes from about 5 microns to about 100 microns.

21. A process for forming a polymer composite article comprising:
feeding a thermoplastic polymer and reinforcing fibers into a barrel of an injection molding system, wherein the injection molding system comprises a screw contained within the barrel, and wherein the screw has a compression ratio of less than 2.5:1;
heating the thermoplastic polymer to a molten state;
feeding a blowing agent into the barrel;
injecting the thermoplastic polymer, reinforcing fibers, and blowing agent into a molding cavity; and
producing a cellular fiber reinforced polymer article, wherein the reinforcing fibers in the reinforced polymer article have an average fiber length greater than 1.2 mm, and wherein at least 10 percent by volume of the reinforcing fibers have a length greater than 3 mm.

22. The process according to claim 21, wherein the screw further comprises a first section containing flights and a second section containing flights downstream from the first section, and wherein a check valve separates the first section from the second section.

23. The process according to claim 22, wherein the check valve comprises a ring check valve.

24. The process according to claim 22, wherein feeding the blowing agent into the barrel further comprises feeding the blowing agent into the barrel at a location downstream from the check valve.

25. The process according to claim 21, wherein the screw further comprises a first section containing flights and a second section containing flights downstream from the first section, wherein the flights contained within the second section of the screw comprise broken flights containing spaced apart gaps.

26. The process according to claim 21, wherein the screw has a rotational speed that is less than 70 rpm, and wherein the barrel has a back pressure that is less than 2,000 psi.

27. The process according to claim 26, wherein injecting further comprises injecting the thermoplastic polymer, reinforcing fibers, and blowing agent into the molding cavity at a temperature of less than about 100 degrees C.

* * * * *